United States Patent [19]

Okada et al.

[11] 3,995,137

[45] Nov. 30, 1976

[54] ALTERNATING CURRENT ARC WELDER

[75] Inventors: Toshiyuki Okada, Osaka; Tomonori Takemoto, Oaza Ibaragi; Hiroshi Nakayama, Osaka, all of Japan

[73] Assignee: Osaka Transformer Co., Ltd., Japan

[22] Filed: Mar. 27, 1974

[21] Appl. No.: 455,406

[30] Foreign Application Priority Data

Mar. 29, 1973 Japan .............................. 48-35045

[52] U.S. Cl. .............................. 219/131 R; 323/45
[51] Int. Cl.² ............................................ B23K 9/00
[58] Field of Search ..... 219/131 F, 131 WR, 131 R; 323/4, 24, 43.5 S, 45, 80

[56] References Cited
UNITED STATES PATENTS

| | | | |
|---|---|---|---|
| 2,529,111 | 11/1950 | Steinberger ..................... | 219/131 F |
| 3,018,431 | 1/1962 | Goldstein ............................ | 323/45 |
| 3,195,038 | 7/1965 | Fry ................................. | 323/43.5 S |
| 3,375,435 | 3/1968 | Baugher ............................. | 323/4 |
| 3,379,960 | 4/1968 | May ................................ | 323/45 |
| 3,611,117 | 10/1971 | Schneider .......................... | 323/45 |
| 3,743,921 | 7/1973 | Legg et al. .......................... | 323/4 |

*Primary Examiner*—J. V. Truhe
*Assistant Examiner*—Clifford C. Shaw
*Attorney, Agent, or Firm*—Craig & Antonelli

[57] ABSTRACT

An AC arc welder which comprises means for detecting the welding current, a comparison circuit for generating logical output signals by comparing the output voltage or output current of the welding current detecting means with the reference voltage or reference current from a reference voltage generating means, digital means for generating logical output signals by performing adding operation or subtracting operation in response to the logical output signal, current supplying means for supplying the output current whose common ratio becoming the geometrical series of approximately $m(m = 1, 2, 3 \ldots )$, and switching means for on and off- controlling the output of the current supplying means in response to the logical output signals of the digital means, thus forming a current feedback loop, whereby the output current from the current supplying means can be changed minutely, thus ensuring stabilized control characteristics.

8 Claims, 43 Drawing Figures

(a)

(b)

(a)

(b)

(a)

(b)

(a)

(b)

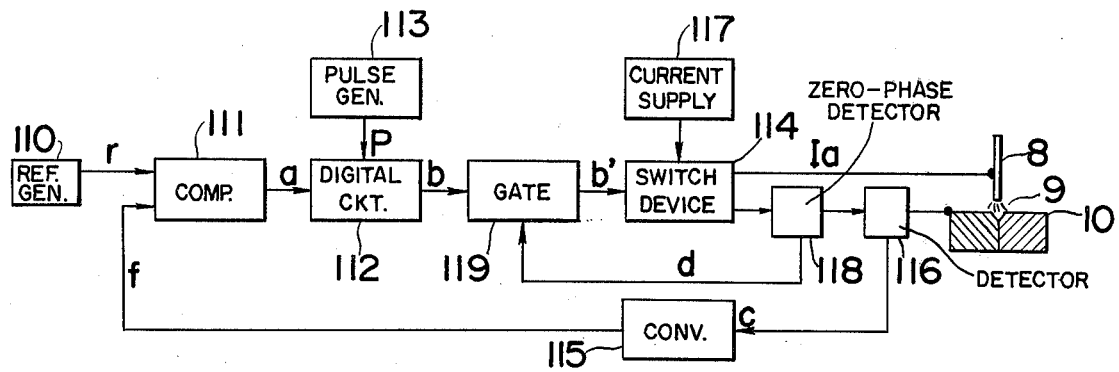
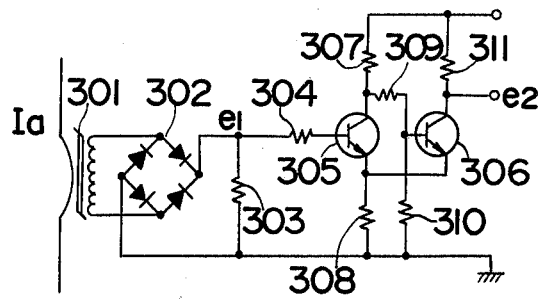
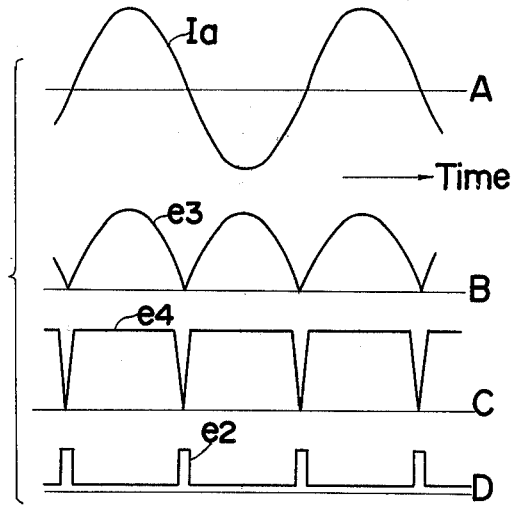
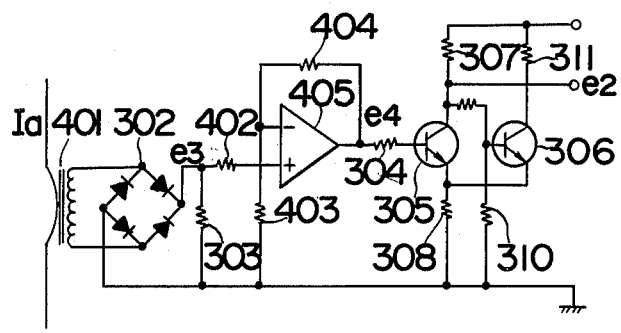
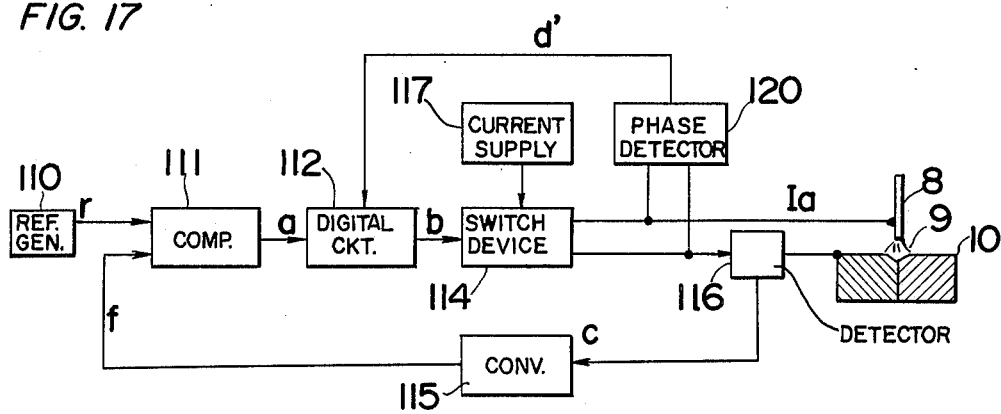

ALTERNATING CURRENT ARC WELDER

The present invention relates to an alternating current arc welder whose external characteristics output current voltage characteristics assume drooping characteristics, and more particularly to an alternating current arc welder which is constructed without use of a moving iron core and is capable of regulating the out current over very wide range, the external characteristics thereof being normally provided with constant-current characteristics of high precision.

Conventionally, the AC arc welder whose output current voltage characteristics assume the dropping characteristics normally has used the moving iron core. In this type of AC arc welder, the moving iron core is moved to vary leakage magnetic flux as described later, whereby the magnetic flux amount interlinking the output windings is adapted to be regulated to control the output current. Accordingly, in this type of AC arc welder, it is required to frequently move the moving iron core of heavy weight in regulating the output current. Therefore, the moving mechanism thereof becomes complex, resulting in shorter life and inferior reliability. Also, generally, this type of AC arc welder has had disadvantages of being extremely inconvenient, since the changes in the output current which are caused by changes in the output voltage are not only unsuitable for precise welding operation, but also requires re-regulation of the output current upon changing in the output voltage due to any causes.

To clarify the background of the present invention, the conventional AC arc welder of the type above referred to will be hereinafter fully discussed with reference to two of the attached drawing and wherein, FIG. 1a is a perspective view showing the structure of a conventional AC arc welder, FIG. 1b is one example of a curve graph showing the output current voltage characteristics of the AC arc welder shown in FIG. 1a.

Referring to FIG. 1a, primary windings 3 and 3' wound around an iron core 1 are connected to a power source S, and secondary windings 4 and 4' wound around the iron core 1 are connected to a welded material W at their one end, and to a welding electrode E at their other end. A movable core 2 is releasably disposed, between the primary windings 3 and 3' and the secondary windings 4 and 4', in a window surrounded by the iron core 1.

Current flowing into the primary windings 3 and 3' by supplying the power from the power source S flows the magnetic flux to the iron core 1. The magnetic flux flows interlinking the secondary windings 4 and 4', and shunts through a movable shunt core 2 from the iron core 1. And the shunting magnetic flux, namely, the leakage magnetic flux is determined by the position of the movable shunt core 2. Accordingly, regulation of the shunting leakage magnetic flux amount by properly regulating the insertion amount of the movable shunt core adjusts the magnetic flux amount which interlinks with the secondary windings 4 and 4', whereby the output current is regulated. In this case, the relationship between the output voltage $V_0$ and the output current $I_0$ in a case where the movable shunt core 2 is moved at different positions $P_1$, $P_2$ and $P_3$ assumes drooping characteristics as shown in FIG. 1b.

In the welding operation, the welding current which is suitable for the welding portion of the welded material is normally required to be used. However, according to the AC arc welder of the type as described above, the movable shunt core has to be moved frequently to regulate the output current. Accordingly, the movable shunt core has to normally move lightly and smoothly. However, generally the movable shunt core is substantially heavy. In order to slidably move it lightly and smoothly, the moving mechanism becomes complex. The moving mechanism causes problems in life and reliability, since it not only complicates the manufacturing and regulating operations extremely, but also is likely to cause abrasion and looseness because of the frequent slide movements. Also, changes in arc voltage and welding current during welding operation also changes the welding results. Particularly, in the welding operation using this type of AC arc welder, the effects of the welding results with respect to the changes in welding current are greater. Accordingly, the changes in the arc voltage are unavoidable to some extent, but the changes in welding current should be avoidable. However, as this type of AC arc welder is normally provided with characteristics of the output current voltage as described in FIG. 1b, the output current also changes due to changes in power source or changes in arc voltage. Accordingly, this fact is unsuitable for precise welding operation. Also, if the output current is set properly at the beginning of the welding operation, it is required to re-adjust it, since the welding current changes by the changes in arc voltage during welding operation. Thus, it is extremely inconvenient.

It is primary object of the present invention to suggest an AC arc welder which is free from such disadvantages as described herein above in the conventional AC arc welder and is capable of regulating the output current over very wide range without the moving portion. Furthermore, it is a secondary object of the present invention to suggest an AC arc welder wherein the output current voltage characteristics have the high precision of constant-current characteristics despite the changes in power source voltage or in arc voltage.

The present invention comprises means for detecting the welding current, a comparison circuit for generating logical output signals corresponding to the magnitude relation of both voltages or both currents by comparing the output voltage or output current of the welding current detecting means with the reference voltage or reference current from a reference voltage generating means, digital means for generating logical output signals by performing adding operation or subtracting operation in response to the logical output signal, current supplying means comprising a reactor for supplying the output current whose common ratio becoming the geometrical series of approximately $m(m = 1, 2, 3 \ldots)$, and switching means for on and off-controlling the output of the current supplying means in response to the logical output signals of the digital means, thus forming a current feed back loop. Accordingly, the output current from the current supplying means can be changed minutely, thus ensuring stabilized control characteristics. Also, extremely minute deviation between the reference voltage and the feedback voltage from the current detecting means can be identified. Thus, if any disturbances are caused, the output current is corrected until the feedback voltage becomes almost equal to the reference voltage. The output voltage current characteristics assume almost constant-current characteristics wherein the output current is maintained to a given value independently of the output voltage.

These and other object and features of the present invention will become apparent from the following description taken in conjunction with preferred embodiments with reference to the accompanying drawings, in which;

FIG. 1a is a perspective view showing the structure of a conventional AC arc welder.

FIG. 1b is one example of a curve graph showing the output current-voltage characteristics of the AC arc welder shown in FIG. 1a.

Figure 3:
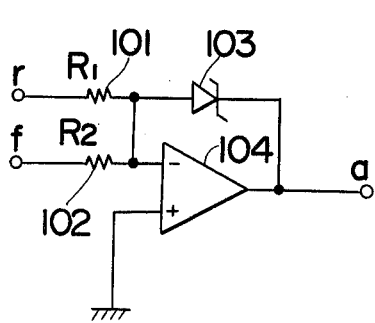
Figure 3:
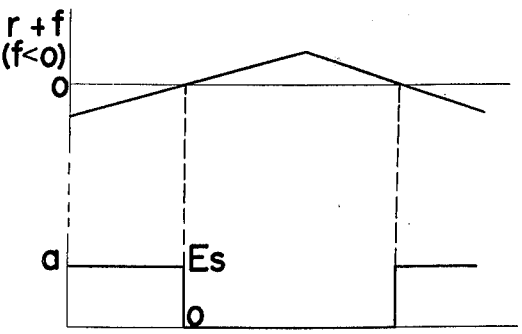
Figure 4:
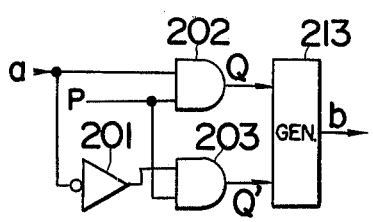
Figure 6:
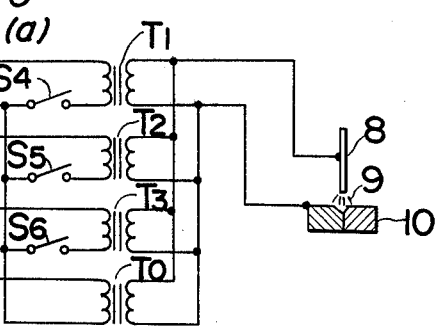
Figure 6:
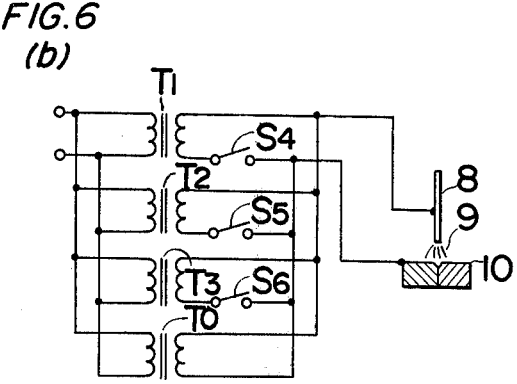
Figure 6:
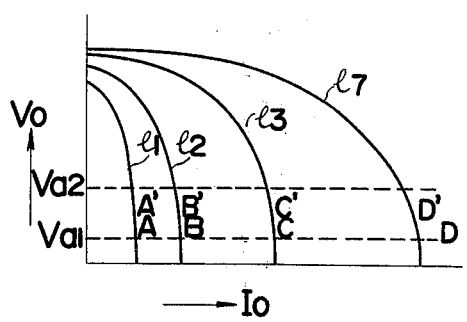
Figure 5:
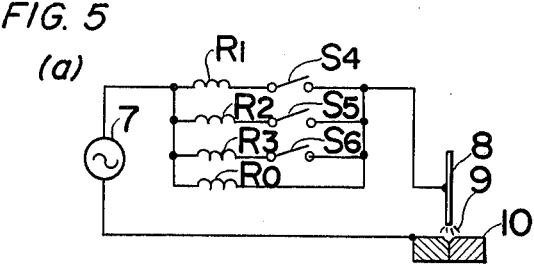
Figure 5:
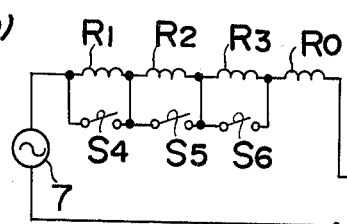
Figure 5:
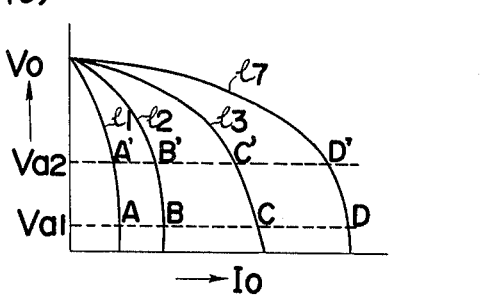
Figure 7:
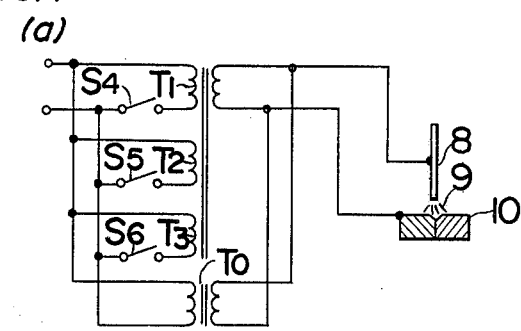
Figure 7:
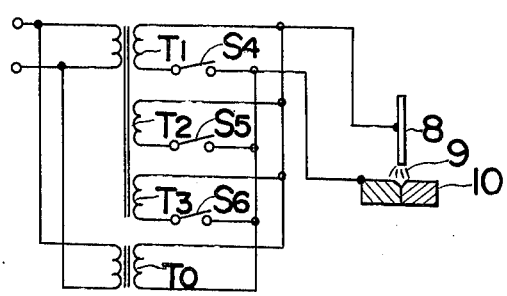
Figure 8:
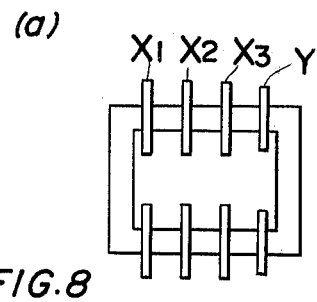
Figure 8:
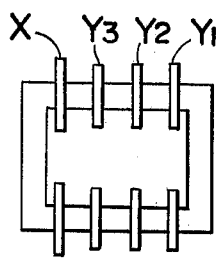
Figure 9:
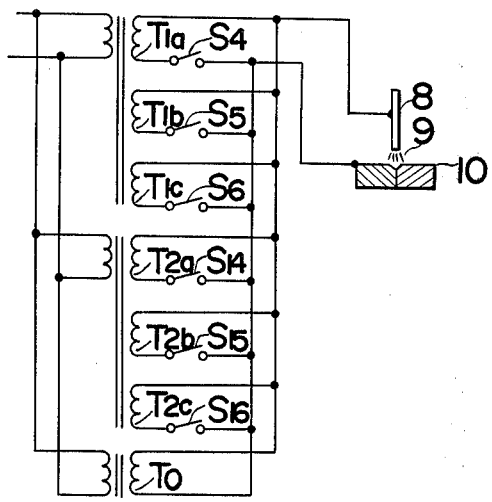
Figure 10:
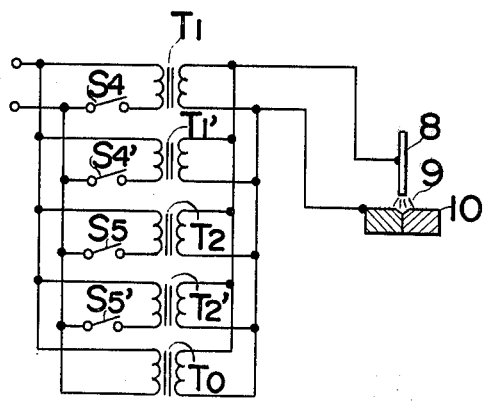
Figure 11:
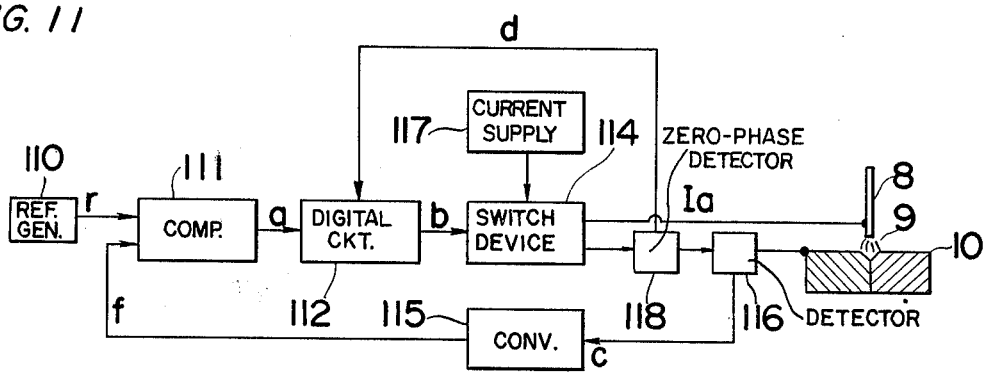
Figure 18:
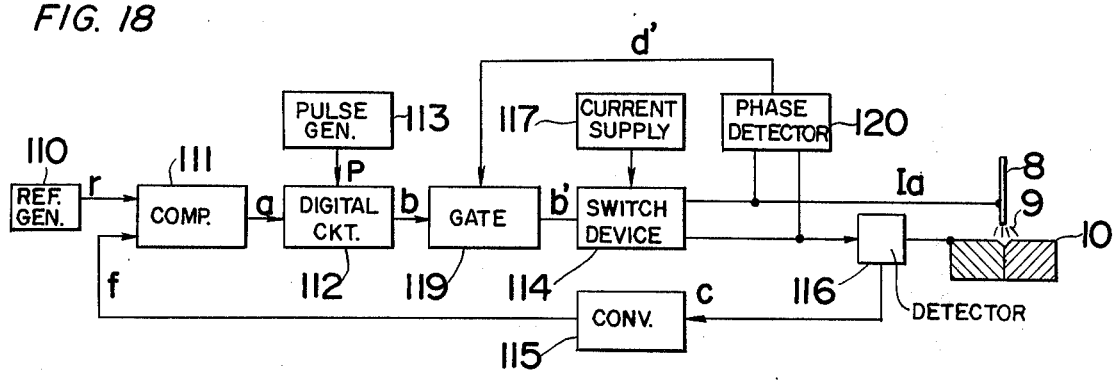
Figure 19:
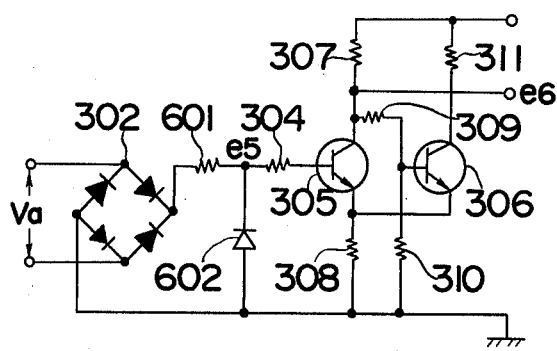
Figure 21:
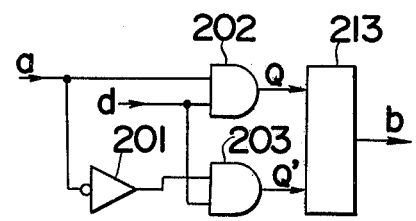
Figure 20:
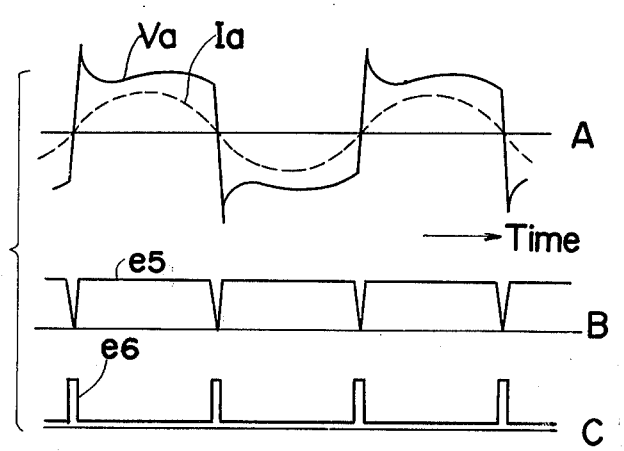
Figure 22:
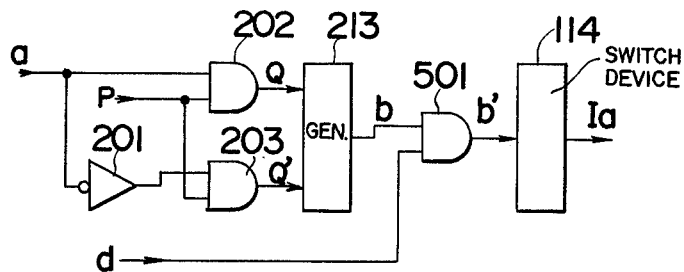
Figure 23:
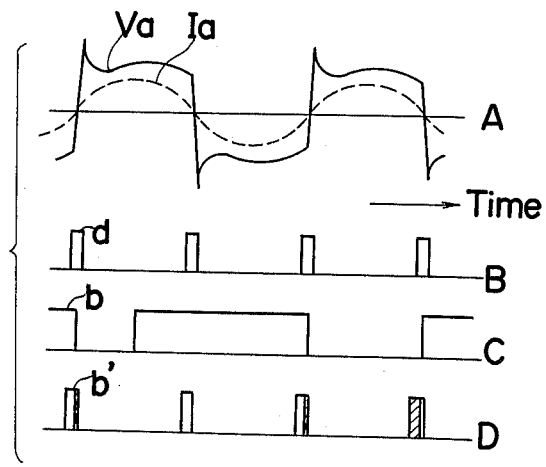
Figure 24:
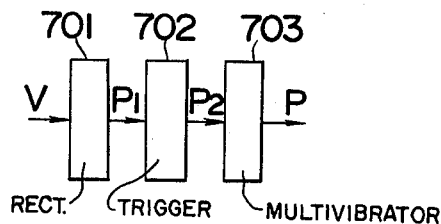
Figure 25:
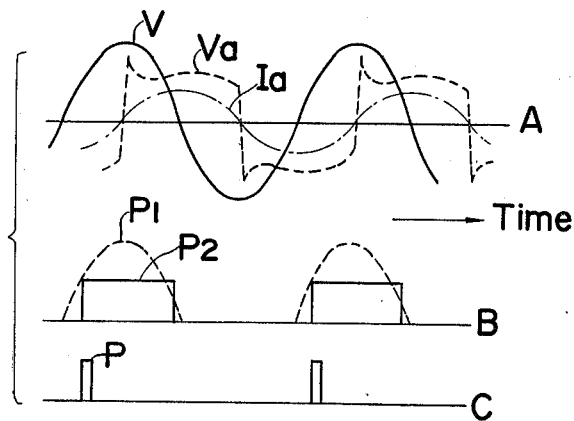

FIG. 2a is a block diagram showing a fundamental construction of the present invention, FIG. 2b is a curve graph showing the output voltage current characteristics of the AC arc welder constructed as shown in FIG. 2a, FIG. 3a is a circuit diagram showing one example of a comparison circuit constructed as in FIG. 2a, FIG. 3b is a signal wave form chart of each section of the comparison circuit shown in FIG. 3a, FIG. 4 is a block diagram showing a construction example of a digital means constructed as shown in FIG. 2a, FIGS. 5a and 5b are circuit diagrams showing examples, respectively, of a current supplying means and a switching means in the construction shown in FIG. 2a, FIG. 5c is a curve graph showing the output voltage current characteristics constructed as shown in FIG. 5a, FIGS. 6a and 6b are circuit diagrams showing different examples, respectively, of the current supplying means and the switching means in the construction as shown in FIG. 2a, FIG. 6c is a curve graph showing the output voltage current characteristics constructed as shown in FIG. 6a, FIGS. 7a and 7b are circuit diagrams showing further examples, respectively, of the current supplying means and the switching means in the construction as shown in FIG. 2a, FIGS. 8a and 8b are a construction view showing a transformer used in the construction shown in FIGS. 7a and 7b respectively, FIGS. 9 and 10 are circuit diagrams showing still further construction examples, respectively, of the current supplying means and the switching means in the construction as shown in FIG. 2a, FIG. 11 and FIG. 12 are block diagrams showing a different construction of the present invention, FIG. 13 is a circuit diagram showing the construction example of welding current zero phase detecting means in the construction shown in FIG. 11 and FIG. 12, FIGS. 14A, 14B and 14C are respectively, signal wave form charts of each section in the circuit shown in FIG. 13, FIG. 15 is a circuit diagram showing another construction example of the welding current zero phase detecting means in the construction shown in FIG. 11 and FIG. 12, FIGS. 16A, 16B and 16C are respectively a signal wave form chart of each section in the circuit shown in FIG. 15, FIGS. 17 and 18 are block diagrams showing further modifications of the present invention respectively, FIG. 19 is a circuit diagram showing the construction example of an arc voltage arc reignition phase detecting means in the embodiment shown in FIG. 17 and FIG. 18, FIG. 20 is a signal wave form chart of each section in the circuit shown in FIG. 19, FIG. 21 is a block diagram showing the construction example of the digital means in the construction shown in FIG. 11, FIG. 22 is a block diagram showing the construction example of the gate circuit in the construction shown in FIG. 12, FIGS. 23A, 23B, 23C and 23D are respectively signal wave form charts for illustrating the actions of the examples shown in FIG. 12 and FIG. 18, FIG. 24 is a block diagram showing the essential parts of a still another embodiment of the present invention, and FIGS. 25A, 25B and 25C are respectively signal wave form charts of each section of the embodiment shown in FIG. 24.

Before the description of the present invention proceeds, it is to be noted that like parts are designated by like reference numerals throughout the accompanying drawings, and, for the sake of brevity, the explanation thereof in the subsequent embodiments is omitted throughout the following desclosure.

EMBODIMENT I

FIG. 2a is a block diagram showing a fundamental construction of one preferred embodiment of an AC arc welder according to the present invention. The comparison circuit 111 is adapted to generate a logical output signal a in response to the magnitude relation by comparing a reference voltage $f$ which is generated in a known reference voltage generating circuit 110, with a feedback voltage $f$ from an output current detecting means 116. A digital means 112 is synchronized to the output pulse p of a known pulse generating means 113 and performs addition operation or substraction operation in response to the logical output signal $a$, whereby the logical output signal $b$ is generated. A current supplying means 117 supplies the current, whose common ratio becoming geometrical series of $m$ ($m = 1, 2, 3 ..$.), and the output current is controlled in a switching means 114 in response to the logical output signal $b$ from the digital means 112 thereby to supply the welding current Ia to a welding electrode 8. The welding current Ia is detected by the current detecting means 116 and the detection signal $c$ is rectified and smoothed by a wave form converting means 115 and thereafter is fed back to the comparison circuit 111 as a voltage $f$.

According to the AC arc welder of such construction as described hereinabove, the current feedback loop is formed as described hereinabove. As the controlling of the output current Ia is synchronized to the clock pulse $p$ and changes minutely in step-form, extremely stabilized control characteristics can be obtained by regulating the output current change per step in period of the clock pulse $p$. Also, as the comparison circuit 111 which can identify up to extremely small divisions between the reference voltage $r$ and the feedback voltage $f$ can be used, the output current Ia is corrected until the feedback voltage $f$ becomes equal to the reference voltage $r$ even if any disturbances are caused. Accordingly, the relation between the output voltage $V_0$ and the output current $I_0$ assures a constant-current characteristic wherein one current $Ia_1$, $Ia_2$, $Ia_3$ maintains one given value independently of the voltage $V_0$ as shown in FIG. 2b. The current does not change if the arc voltage changes during the welding operation. Once the welding current is set, it is not required to be regulated again. Also, $Ia_1$, $Ia_2$ and $Ia_3$ in FIG. 2b are respectively output current which has been set by the switching means 114.

Figure 1:
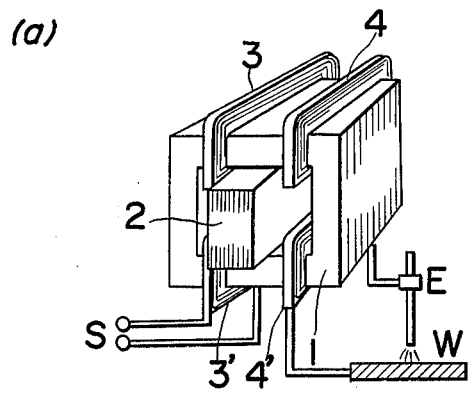
Figure 1:
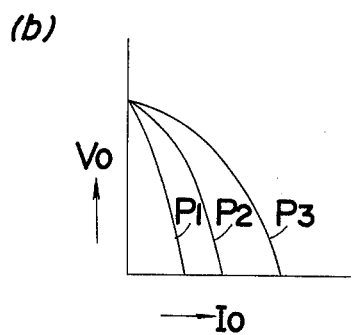
Figure 2:
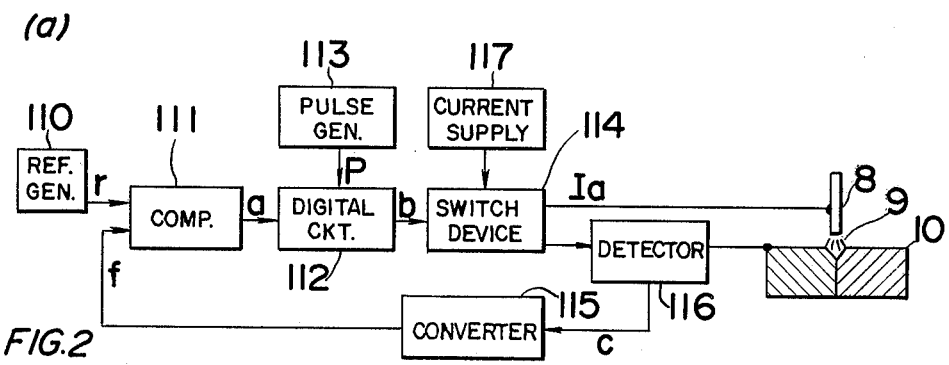
Figure 2:
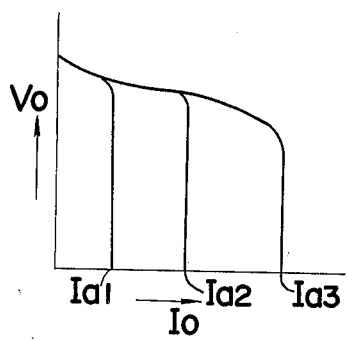

Subsequently, each section means of the construction as shown in FIG. 2 will be described fully hereinbelow.

Comparison Circuit 111

FIG. 3a showing one embodiment of the comparison circuit 111, the reference voltage r and the feedback voltage f are connected with each other through resistors 101 and 102, respectively. The connecting point therebetween is connected to the positive electrode of a constant voltage diode 103, and simultaneously is connected to the negative electrode of the constant voltage diode 103 through an operation amplifier 104. Assuming that resistance values of the resistors 101 and 102 are $R_1$ and $R_2$, and the constant voltage diode is a resistor of a resistance $R_3$ equivalently, a relation formula of the logical output signal $$a = \left( \frac{r}{R_1} + \frac{f}{R_2} \right) R_3$$

is established.

The constant voltage diode 103 is considered to be a resistance value $R_3 = 0$ approximately in direction of easy flow, while $R_3 = \infty$ under a breakdown voltage $E_s$ and $R_3 = 0$ above the $E_s$ in the reverse direction. For example, assuming that the signal of the feedback voltage f is negative, $a = 0$ in $|r| > |f|$ and $a = E_s$ in $|r| < |f|$. Accordingly, as shown in FIG. 3b, the circuit generates a two-value logical output signal $a$ of output voltage zero or $E_s$ in response to the extremely small changes between $|r|$ and $|f|$ as shown in FIG. 3b.

In this embodiment, a case wherein the two-value logical output signal is generated has been described, but any comparison circuits can be used if, needless to say, a three-value logical output signal of $(1, 0, -1)$ is generated, and the logical output signal can be generated by detecting the minute deviation.

Digital Means 112

In FIG. 4 showing one embodiment of the digital means 112, the logical output signal $a$ and the clock pulse $p$ from the pulse generator 113 are applied upon an and gate 202 which, in turn generates an output Q. A signal, which has been inverted by an inverter 201 of the logical output signal $a$, together with the clock pulse $p$ is impressed upon an and gate 203 which, in turn generates an output Q'. Namely, as can be understood readily from the drawing, the pulse which is synchronized to the clock pulse p in response to the logical output signal $a$ appears as Q or Q'. For example, as described hereinabove, a is at a condition [0] in case of $|r| > |f|$. Upon impression of the clock pulse $p$ of a condition [1], the pulse does not appear in the output Q, while the pulse of a condition [1] is generated in the output Q'. Reference numeral 213 is means for generating a logical output signal $b$ wherein the signals Q and Q' are received to perform adding operation or subtracting operation. Electronic devices or mechanical devices which are widely on the market can be used therefor.

Any digital means is not limited to the embodiment, but can be used if they can perform adding operation or subtracting operation in response to the logical input signal and generate the logical output signal. Current Supplying Means 117 and Switching Means 114:

Referring to FIG. 5a, reactors $R_1$, $R_2$ and $R_3$ whose ratio if 4 : 2 : 1 in inductance, and the other reactor $R_0$ are commonly connected, at their one end, to a power source 7, and are connected in series, in their other end, respectively to switching means $S_4$, $S_5$ and $S_6$. The other end of the reactor $R_0$ and the other ends of the switching means $S_4$, $S_5$ and $S_6$ are commonly connected, and then are connected to a welding electrode 8 to feed the power between the welding electrode 8 and a welded material 10 which is connected to the other end of the power source 7 to generate the arc 9. In this case, the current Ia fed to the welding electrode 8 is different depending upon the make and break condition of the switching means $S_4$, $S_5$ and $S_6$. Assuming that the currents flowing in the reactors $R_0$, $R_1$, $R_2$ and $R_3$ are $I_{00}$, $I_1$, $I_2$ and $I_3$, a formula $Ia = I_{00} + a_1 I_1 + a_2 I_2 + a_3 I_3$ is generally established. Since the reactors $R_1$, $R_2$ and $R_3$ are selected so that the common ratio thereof may be $4 : 2 : 1$, $I_2 = 2I_1$, $I_3 = 4I_1$. Therefore, $Ia = I_{00} + a_1 \times I_1 + a_2 \times 2I_1 + a_3 \times 4I_1$.

In this embodiment, from the relation formula eight types of current ranging from $Ia = I_{00}$ to $Ia = I_{00} + 7I_1$ can be obtained by controlling the switching means $S_4$, $S_5$ and $S_6$. From this description, the output current, wherein the reactors, whose inductance becoming the geometrical series of the common ratio 2, and the switching means are of $n$ number, $$\text{is } Ia = I_{00} + \sum_{i=1}^{n} ai \cdot 2^{n-1} \cdot I_1.$$

Thus, it can be readily understood that $2^n$ stages current switching is possible with minimum current $I_1$ as a unit. In this case, the current $I_{00}$ determines the minimum value of the output current and accordingly may be zero. Therefore, the reactor 0 in FIG. 5a may be removed, but generally the bottom limit in the regulating range of the welding current is not required to be zero. The current of the required regulating range can be controlled precisely only if a given base current $I_{00}$ is kept flowing. FIG. 5c shows output voltage current characteristics in this embodiment, wherein $1_1$, $1_2$ and $1_3$ shows respectively a characteristic curve with respect to the current $I_0$ flowing in the reactors $R_1$, $R_2$ and $R_3$, $1_7$ showing the output current Ia with the switching means $S_4$, $S_5$ and $S_6$ being all closed. For the sake of brevity, the base current $I_{00}$ is omitted. Operating points in welding at arc voltage $Va_1$ are respectively represented by A, B, C and D. Upon changing of the arc voltage to $Va_2$, the operating points are moved to A', B', C' and D' respectively. In this case, since the common ratio of the current which flows in the reactors $R_1$, $R_2$ and $R_3$ is maintained to 1 : 2 : 4 independently of the arc voltage, logical instructions given to the switching means, and the actual output Ia are not contradictory, showing 1 : 1 correspondence.

Referring to 5b, the reactors $R_0$, $R_1$, $R_2$ and $R_3$ are connected in series, and the switching means $S_4$, $S_5$ and $S_6$ are connected in parallel to the reactors $R_1$, $R_2$ and $R_3$ respectively. In this case, it is obvious that the reactor $R_0$ shows the same effect as in the embodiment shown in FIG. 5a with an exception that the reactor $R_0$ fixes the maximum value of the output current Ia.

In the embodiment as shown in FIG. 6a, the output windings of transformers $T_0$, $T_1$, $T_2$ and $T_3$ wherein the output current voltage has drooping characteristics, and the output current has the normal ratio of 1 : 2 : 4, are connected in parallel with each other. The total of the respective output current is supplied to the electrode 8. The input windings of the transformers $T_1$, $T_2$ and $T_3$ are connected in parallel together with the input winding of the transformer $T_0$ through the switching means $S_4$, $S_5$ and $S_6$. Assuming that the output current of the transformers $T_0$, $T_1$, $T_2$ and $T_3$ are $I_{00}$, $I_1$, $2I_1$, $4I_1$ respectively, eight stages of switching operation ranging from $Ia = I_{00}$ to $Ia = I_{00} + 7I_1$ with $I_1$ as a unit can be performed even in the embodiment as described hereinabove. From this description, if n number of transformers, whose output current common ratio becomes 2, except the transformer $T_0$, and n number of switching means are used, it is easily understood that $2^n$ stages of switching operation ranging from $Ia = I_{00}$ to $Ia = (2^n - 1)I_1$ $2 I_1$ as a unit can be performed.

The transformer $T_0$ is not necessarily required as the reactor $R_0$ shown in FIGS. 5a and 5b.

FIG. 6c shows the output voltage current characteristics in this embodiment, wherein $I_{00}$ is omitted for the sake of brevity. $1_1$, $1_2$ and $1_3$ show a characteristics with respect to the transformers $T_1$, $T_2$ and $T_3$ respectively, $1_n$ showing a characteristic with respect to the output current Ia in a case where switching means $S_4$, $S_5$ and $S_6$ have been all closed. Generally, the output voltage current characteristics of the transformer showing the drooping characteristic are such curves as shown in FIG. 6c. Accordingly, where no load voltage is different remarkably, for example, if the current in operating points A, B, C with respect to the arc voltage $Va_1$ becomes 1 : 2 : 4 in common ratio, the current in operating points A', B', C' with the arc voltage $Va_d$ may not show the relation of 1 : 2 : 4 in common ratio. In this case, consider where the instructions with respect to the switching means are (100), (011), and the contradiction where the output current Ia with respect to the (100) is smaller than the output current ia with respect to the (011) may be produced. In order to prevent this, all that is necessary is to maintain the dispersion of no load voltage within 30% or less, considering a case where generally the welding voltage becomes one half to one quarter of the no load voltage. In this case, it has been confirmed that the common ratio of the current can be maintained constant with precision of 15% or so, thus satisfying the object of the present invention.

In the embodiment of FIG. 6b, the switching means $S_4$, $S_5$ and $S_6$ are mounted on the output windings of each transformer $T_1$, $T_2$ and $T_3$, and the operation effect thereof is the same as that of the embodiment of FIG. 6a.

In the embodiment shown in FIG. 7a, one output winding Y and a plurality of input windings $X_1$, $X_2$ and $X_3$ are wound around such a ring-shaped iron core as shown in FIG. 8a, and such a transformer as the common ratio of the output winding Y with respect to the input windings $X_1$, $X_2$ and $X_3$ becomes a multiple of 2 is used. Accordingly, the operation effect thereof is just the same as that of FIG. 6a.

In the embodiment shown in FIG. 7b, one input winding X and a plurality of output windings $Y_1$, $Y_2$ and $Y_3$ are wound on such ring-shaped iron core as shown in FIG. 8b, and such a transformer as the common ratio of the output windings with respect to the input winding becomes a multiple of 2 is used. Even in this case, the operation effect thereof is just the same as that of FIG. 6b.

FIG. 9 shows an embodiment wherein a plurality of transformers $T_{1a}$, $T_{1b}$, $T_{1c}$, $T_{2a}$, $T_{2b}$, $T_{2c}$ each having one input winding and a plurality of output windings as shown in FIG. 8b, are used so that the common ratio of the output current may become a multiple of 2. Although not shown here, a plurality of transformers are used, each having a plurality of input windings and one output winding as shown in FIG. 8a, whereby the similar operation effect can be obtained.

In the embodiment for the current supplying means and the switching means described hereinabove, a binary logical system wherein the inductance of the reactor or the current common ratio of the constant-current transformer becomes the geometrical series of 2 has been described. However, needless to say, it is possible to perform based on m-radix rotation of logical system. As one example thereof, the embodiment, which is based on a ternary of logical system using a plurality of constant-current transformers, will be described hereinafter. Referring to FIG. 10, $T_1$ and $T_{1'}$ are respectively a constant-current transformer having the same output winding current. Assuming that the output winding current of the transformer $T_1$, $T_{1'}$ is $I_1$, the transformers $T_2$ and $T_{2'}$, which can supply the same winding current $3I_1$, are used. The transformer $T_0$ is adapted to flow the fundamental current as described before, and is not necessarily required. In this embodiment, assuming that the output current is $I_0$, the current Ia supplied to the welding electrode 8 is controlled by the switching operation of the switching means $S_4$, $S_4$, and $S_5$, $S_5$ . Generally, $Ia = I_0 + a_1I_1 + a_23I_1$ (wherein $a_1$ and $a_2$ are 0 or 1 or 2). Nine stages of changes ranging from $Ia = I_0$ to $Ia = I_0 + 8I_1$ with $I_1$ as a unit are possible.

Generally, considering a case where the present invention in the $m$ — radix notion of logical system is practised, $m$ — 1 number of transformers are used respectively wherein the common ratio of the output windings will become the geometrical series of $m$. Assuming that the output winding current of the transformer supplying the minimum unit current is $I_1$ and the output winding current of the transformer supplying the maximum output current is $m^nI_1$, the welding current Ia allows m $^{n+1}$ stages of switching operation ranging from $Ia = 0$ to $Ia = (m^{n+1} - 1)I_1$ with $I_1$ as a unit. In this case, the transformers wherein the output winding current becomes $I_1$, $mI_1$, $m^2I_1$ . . . $m^nI_1$ respectively are required by $(m - 1)$ number respectively, the total of the transformers becoming $(m - 1)n$ number. In following such general $m$ — radix notion of logical system, it is needless to say that each embodiment described in FIGS. 2 to 10 can be applied without any doubt. In practising the present invention according to the $m$ — radix notion of logical system, $m$ — radix notion of digital means may be used as a digital means 112 as shown in FIG. 2a. However, the output may be changed to $m$- radix notion by the code converter by use of the binary of digital means.

In the current supplying means and the switching means described hereinabove, an electromagnetic switch, an one-way semiconductor control element or a two-way semiconductor control element, which is connected in reverse parallel, and others can be used for the switching means. Current Detecting Means 116:
A resistor or a current transformer, etc. are used.

Wave Form Converter 115

A common means composed of a diode, condenser, reactor, etc.

EMBODIMENT II

In the 1st embodiment 1 as described hereinbefore, the on and off operation for the switching means is effected in an optional phase. Generally, when the current supplying means is turned on and off by the switching means, DC current is flowed by a transient phenomenon upon switching and the magnetic flux of the reactor for the current supplying means or of the leakage transformer, etc. is saturated, whereby excessive current flows flows to the switching means or abnormal beating may be caused in the current supplying means, with the exception of a case where the phase delay with respect to the switching voltage and the current phase delay with respect to the voltage of the current supplying means coincide. Also, high circulating current may flow between current supplying means by differences in the output polarity of the current feeding means, depending upon the switching phase. The welding current is reduced remarkably, and accordingly the arc becomes unstable and the current capacity of the switching means must become very great.

Accordingly, the present invention is provided in obtaining the better results which are free from the abovementioned problem by effecting the on and off operation for the switching means through synchronizing to an approximate zero crossing of the welding current.

FIGS. 11 and 12 show the construction example of the present invention in a case where the on and off operation for the switching means 114 is effected through synchronizing to the zero current position of the welding current.

Referring to FIG. 11, instead of a pulse generation 113, in the construction shown in FIG. 2a, a welding current zero phase detecting means 118, is between the switching means 114 and current detecting means 116 provided, wherein the approximate zero crossing of the welding current is detected and the output pulse d is generated through synchronizing to the approximate zero phase of the welding current. The digital means 112 is adapted to effect the adding or subtracting operation by synchronizing to the output pulse $d$. Accordingly, the on and off operation of the switching means 114 controlled by the logical output signals of the digital means 112 is also effected through synchronization to the output pulse of the welding current zero phase detecting means 118, namely, the approximate zero phase of the welding current.

Referring to FIG. 12, in addition to the construction shown in FIG. 2a, there are provided the same welding current zero phase detecting means 118 as shown in FIG. 11, and a gate circuit 119 between the digital means 112 and switching means 114, which is adapted to transmit the switching signals to the switching means 114 only while the output pulses $d$ of the detecting means are being transmitted. The switching means 114 effects the on and off operation through synchronization to the approximate zero phase of the welding current.

Subsequently, FIGS. 13 and 15 are circuit diagrams showing examples of the welding current zero phase detecting means 118 used in the embodiment shown in FIGS. 11 and 12 respectively. FIGS. 14A to 14C and FIGS. 16A to 16D show the wave form of the current voltage of the each section in FIGS. 13 and 15 respectively.

Figure 14:
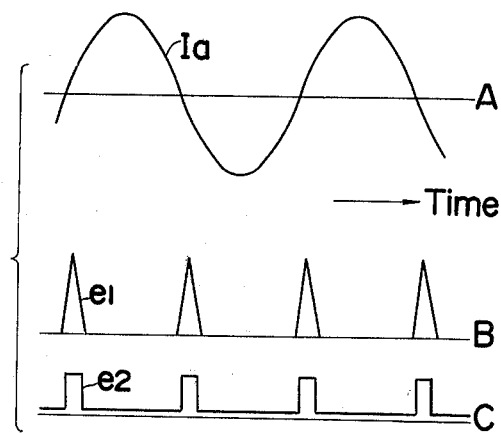

Welding Current Zero Phase Detecting Means 118:

Referring to FIG. 13, a saturable reactor 301 generates the pulse current in the approximate zero phase of the welding current Ia shown in FIG. 14A. After the pulse current has been rectified in all waves by a rectifier 302, the pulse current is converted to a voltage pulse $e_1$ as shown in FIG. 14B by a resistor 303, and is input, through a resistor 304 to a well known Schmidt trigger circuit, which is composed of transistors 305 and 306 and resistors 307 to 311. Accordingly, the output voltage $e_2$ as shown in FIG. 14C is obtained on the output side of the Schmidt trigger circuit, the voltage $e_2$ corresponding to the output pulse $d$ of the welding current zero phase detecting means 118 shown in FIGS. 11 and 12.

Since the phase of the zero phase synchronizing pulse is different by the specifications of the saturable reactor iron core and the windings, the specifications of the iron core and the windings are required to be arranged so that the pulses may be generated in the approximate zero phase of the welding current.

Referring to FIG. 15, the current of the current transformer secondary winding of the same phase as the welding current detected by a current transformer 401 is rectified in all waves by means of a rectifier 302, and is converted to a voltage $e_3$ shown in FIG. 16B by the resistor 303 and is input to an operation amplifier 405 together with resistor 402. The operation amplifier 405 is used as a non-inversion amplifier. Assuming that the resistance value of a resistor 403 is R, and the resistance value of a resistor 404 is r, a relation formula of output $$e_4 = (1 + \frac{r}{R}) e_3$$

is established. Besides, as the output $e_4$ is saturated by a power source voltage V of the operation amplifier, a sharp rising trapezoidal wave voltage $e_4$ as shown in FIG. 16 are obtained if r/R is kept extremely large. The output voltage of the operation amplifier is input through the resistor 304 into the Schmidt trigger circuit shown in FIG. 13, pulse voltages $e_2$ synchronized to the approximate zero phase of such welding current as shown in FIG. 16D are produced.

FIGS. 13 and 15 show an embodiment as the welding current zero phase detecting means 118 respectively, but needless to say, it is not limited to these embodiments. Any welding current zero phase detecting means which detects the approximate zero phase of the welding current and generates the output pulse by synchronizing it to the approximate zero phase of the welding current can be used. Embodiment.

In the 2nd embodiment described hereinabove, the welding current zero phase detecting means 118 has been used to effect the switching on and off operation through synchronization to the approximate zero phase of the welding current. However, generally in the AC arc welding, the welding current and the arc voltage become the same in phase, and the zero phase of the welding current almost coincides with the reignition arc phase of the arc voltage. Accordingly, the same results are obtained if the digital means 112 is constructed to effect adding or subtracting operation wherein the reignition arc phase of the arc voltage is detected to generate the output pulse synchronized thereto, thereby to synchronized to this pulse.

Digital Means 112

FIG. 21 is an embodiment of the digital means 112 in the construction as shown in FIG. 11. In the embodiment shown in FIG. 4, instead of the input pulse $p$, the output pulse $d$ of the welding current zero phase detecting means is applied.

Gate Circuit 119

FIG. 22 is an embodiment of a gate circuit 119 in the construction as shown in FIG. 12. The logical output signal $b$ of the digital means 112 shown in FIG. 4 together with the output pulse $d$ of the welding current zero phase detecting means 118 are applied upon an and gate 501 wich generates an output $b'$. As apparent readily from this drawing, the control signals, which correspond to the logical output of the digital means through synchronization to the output pulse $d$ of the welding current zero phase detecting means 118, are transmitted to the switching means 114.

Embodiment IV

In the 1st and 2nd embodiments described hereinabove, the welding current zero phase detecting means has been used to effect the switching on and off operation through synchronization to the approximate zero phase of the welding current. However, generally in the AC arc welding, the welding current and the arc voltage become the same in phase, and the zero phase of the welding current almost coincides with the reignition arc phase of the arc voltage. Accordingly, the same results are obtained if the digital means 112 is constructed to effect the adding or subtracting operation wherein the reignition arc phase of the arc voltage is detected to generate the output pulse synchronized thereto, thereby to synchronize to this pulse.

FIGS. 17 and 18 are respective examples of the present invention using a means for detecting the reignition arc phase of the arc. FIGS. 17 and 18 show, respectively, in the construction of FIG. 11 and 12, the construction of a case wherein an arc voltage reignition arc phase detecting means 120 is used, instead of the welding current zero phase detecting means 118, in the arc voltage reignition arc phase detecting means, the reignition arc phase of the arc voltage being detected to generate the pulse through synchronization to the reignition arc phase of the arc voltage. The same effects as in the examples of FIGS. 11 and 12 are obtained respectively.

Subsequently, one example of the arc voltage reignition arc phase detecting means will be described hereinafter.

Arc Voltage Reignition Arc Phase Detecting Means 120

FIG. 19 shows circuits for the detecting means, FIG. 20A to FIG. 20C show voltage wave forms of each section in the means respectively.

Referring to FIG. 19, the arc voltages $Va$ shown in FIG. 20A are rectified in all waves by a rectifier 302, and thereafter are changed into such trapezoidal wave voltages $e_5$ shown in FIG. 20B by a resistor 601 and a constant voltage diode 602, and are input, through a resistor 304, to a well known Schmidt trigger circuit which is composed of the similar transistor 305, 306 and transistors 307 to 311 as shown in FIG. 13. Thus, output pulses $e_6$ which are synchronized to the approximate reignition arc phase of the arc voltage shown in FIG. 20C as the output of the Schmidt trigger circuit are obtained. The pulse $e_6$ corresponds to the output pulse $d'$ of the arc voltage reignition arc phase detecting means shown in FIGS. 17 and 18.

In the embodiment II and the embodiment IV, the construction wherein the on and off operation of the switching means 114 is effected through synchronization to the approximate zero phase of the welding current or to the approximate reignition arc phase of the arc voltage has been described hereinabove.

In the construction shown in FIG. 12 and FIG. 18, when the output pulse generating phase of a pulse generating means 113, namely, the invention phase of the logical output of the digital means 112 shown in FIG. 23C has been overlapped with the phase of the synchronizing pulses d generating in the approximate zero phase of the welding current as shown in FIG. 23B, or in the approximate reignition arc phase of the arc voltage, into the input signal $b'$ to the switching means 114 are input the both of a switchon signal pulse, of FIG. 23D, whose oblique line portion is excluded, and a switch-off signal pulse, of FIG. 23D, indicated by oblique lines, as shown in FIG. 23D, resulting in the erroneous action of the switching means. Thus, better control characteristics are not obtained. Accordingly, it is required to advance or delay the pulse generating phase of the pulse generating means 113, namely, the inversion phase of the logical output signal of the digital means 112 from the approximate zero phase of the welding current or the approximate reignition arc phase of the arc voltage.

FIG. 24 shows the construction of an embodiment wherein the pulse generating phase of the pulse generating means 113 has been advanced from the approximate zero phase of the welding current or from the approximate reignition arc phase of the arc voltage. FIGS. 25A to 25C show the voltage wave forms of the each section.

Generally, in the AC arc welding operation, the phase of the arc voltage and the welding current is behind the phase of the voltage of the AC power source. Referring now to FIG. 24, the voltage V of the AC power source shown in FIG. 25A is rectified in half the wave by means of a half wave rectifying circuit 701. Thus, the voltage wave forms of $P_1$ shown in FIG. 25B are obtained and are input into the well known Schumidt trigger circuit 702. The output $P_2$ of the Schmidt trigger circuit is input into a well known mono-stable multivibrator circuit 703, and output pulse p of the pulse width peculiar to such mono-stable multivibrator as shown in FIG. 25C is obtained. As apparent readily from FIGS. 25A to 25C, the output pulse is generated in a phase advanced from the zero phase of the welding current. Accordingly, such erroneous actions of the switching means as described hereinabove do not occur.

Also, when the same polarity as the polarity which has been used to switch off is used to switch on in switching-on or -off the primary of the current supplying means containing the transformer as shown in FIG. 6a, FIG. 7a, FIG. 10, etc. by the switching means, the iron core of the transformer is saturated. Therefore, inconveniently excessive primary current flows. Accordingly, in effecting the on and off operation by the switching means, it is required to switch on without fail by a polarity reverse to the polarity which has been used to switch off. In the construction as shown in FIG. 24, the output pulse p is generated in the same period as the frequency of AC power source, and the inversion of the logical output signal of the digital means and the on and off operation of the switching means are also effected in the same period as the frequency of the AC power source. Furthermore, as the on and off operation is effected without fail by a polarity reverse to an AC power source voltage, the saturation of the transformer iron core can be prevented.

Accordingly, the same result can be obtained if the period of the output pulse p is set to the same period as the frequency of the AC power source which has been frequency-divided to one $n$th ($n = 1, 2, 3 \ldots$).

As described hereinabove, the present invention has advantages in that it is capable of regulating the output current over wide range without using the moving iron core, and the output current voltage characteristic has a constant-current characteristic of high precision despite of changes in power source voltage, and welding voltage.

From the foregoing description, it has become clear that the present invention is effective to provide an excellent AC arc welder.

What is claimed is:

1. An alternating current arc welder, operating from an A.C. line source, for producing an arc between an electrode and a workpiece comprising:
    welding current detecting means for detecting welding current and for generating a detection signal;
    wave form converting means for rectifying and smoothing the detection signal and for generating a feedback voltage;
    reference voltage source means for generating a reference voltage;
    comparing means for comparing the reference voltage with the feedback voltage and for generating a first logical output signal in accordance with the comparison;
    pulse generator means for generating clock pulses of constant frequency having a period equal to one of the period of the line frequency of the A.C. line source and of an integral multiple of the period of the line frequency of the A.C. line source, the clock pulses being in synchronism with zero-crossings of the line voltage of said A.C. line source;
    digital means for receiving the clock pulses from said pulse generator means and for generating a plurality of second logical output signals by adding or subtracting pulses having the same period as the clock pulses of constant frequency and the same polarity as the first logical output signal;
    welding current zero-crossing detecting means for generating an output pulse upon detecting the approximate zerocrossing of the welding current;
    current supplying means comprising a plurality of reactors or transformers whose reactance of winding is in a geometrical progression of ratio 2;
    switching means comprising a plurality of switches for making and braking electrical connections between more than one reactor or transformer and one of the A.C. line source and a welding current output lead connected with one of the electrode and workpiece; and
    gate circuit means for connecting said digital means with said switching means, said gate circuit means passing a plurality of second logical output signals to said switches of said switching means, respectively, only when the output pulse of said welding current zerocrossing detecting means is applied thereto, said switching means increasing or decreasing the output current at each clock pulse by a predetermined constant low current value with respect to the output current value immediately prior to the clock pulse.

2. An alternating current arc welder according to claim 1, wherein said pulse generator means generates clock pulses at the same rate as the frequency of the line voltage and in synchronism with the zero-crossings thereof.

3. An alternating current arc welder, operating from an A.C. line source, for producing an arc between an electrode and a workpiece comprising:
    welding current detecting means for detecting welding current and for generating a detection signal;
    wave form converting means for rectifying and smoothing the detection signal and for generating a feedback voltage;
    reference voltage source means for generating a reference voltage;
    comparing means for comparing the reference voltage with the feedback voltage and for generating a first logical output signal in accordance with the comparison;
    pulse generator means for generating clock pulses of constant frequency having a period equal to one of the period of the line frequency of the A.C. line source and of an integral multiple of the period of the line frequency of the A.C. line source, the clock pulse being in synchronism with zero-crossings of the line voltage of said A.C. line source;
    digital means for receiving the clock pulses from said pulse generator means and for generating a plurality of second logical output signals by adding or subtracting pulses having the same period as the clock pulses of constant frequency and the same polarity as the first logical output signal;
    arc voltage zero-potential detecting means for generating an output pulse upon detecting the approximate zero-potential of the arc voltage;
    current supplying means comprising a plurality of reactors or transformers whose reactance of winding is in a geometrical progression of ratio 2;
    switching means comprising a plurality of switches for making and breaking electrical connections between more than one reactor or transformer and one of the A.C. line source and a welding current output lead connected with one of the electrode and workpiece; and
    gate circuit means for connecting said digital means with said switching means, said gate circuit means passing a plurality of said second logical output signals to a plurality of switches of said switching means, respectively, only when the output pulse of said arc voltage zero-phase detecting means is applied thereto, said switching means increasing or decreasing the output current at each clock pulse by a predetermined constant low current value with respect to the output current value immediately prior to the clock pulse.

4. An alternating current arc welder according to claim 3, wherein said pulse generator means generates clock pulses at the same rate as the frequency of the line voltage and in synchronism with the zero-crossings thereof.

5. An alternating current arc welder, operating from an A.C. line source, for producing an arc between an electrode and a workpiece comprising:

welding current detecting means for detecting welding current and for generating a detection signal;

wave form converting means for rectifying and smoothing the detection signal and for generating a feedback voltage;

reference voltage source means for generating a reference voltage;

comparing means for comparing the reference voltage with the feedback voltage and for generating a first logical output signal in accordance with the comparison;

pulse generator means for generating clock pulses of constant frequency having a period equal to one of the period of the line frequency of the A.C. line source and of an integral multiple of the period of the line frequency of the A.C. line source, the clock pulses being advanced in phase by a predetermined amount from zero-crossings of the line voltage of said A.C. line source;

digital means for receiving the clock pulses from said pulse generator means and for generating a plurality of second logical output signals by adding or subtracting pulses having the same period as the clock pulses of constant frequency and the same polarity as the first logical output signal;

welding current zero-crossing detecting means for generating an output pulse upon detecting the approximate zero-crossings of the welding current;

current supplying means comprising a plurality of reactors or transformers whose reactance of winding is in a geometrical progression of ratio 2;

switching means comprising a plurality of switches for making and breaking electrical connections between more than one reactor or transformer and one of the A.C. line source and a welding current output lead connected with one of the electrode and workpiece, and gate circuit means for connecting said digital means with said switching means, said gate circuit means passing a plurality of second logical output signals to said switches of said switching means, respectively, only when the output pulse of said welding current zerocrossing detecting means is applied thereto, said switching means increasing or decreasing the output current at each clock pulse by a predetermined constant low current value with respect to the output current value immediately prior to the clock pulse.

6. An alternating current arc welder according to claim 5, wherein said pulse generator means generates clock pulses at the same rate as the frequency of the line voltage and advanced in phase by a predetermined amount from the zero-crossings thereof, said pulse generator means comprising rectifier means to rectify the line voltage, trigger circuit means to generate trigger pulses from the recitfied line voltage, and monostable multivibrator means to generate clock pulses from the trigger pulses.

7. An alternating current arc welder, operating from an A.C. line source, for producing an arc between an electrode and a workpiece comprising:

welding current detecting means for detecting welding current and for generating a detection signal;

wave form converting means for rectifying and smoothing the detection signal and for generating a feedback voltage;

reference voltage source means for generating a reference voltage;

comparing means for comparing the reference voltage with the feedback voltage and for generating a first logical output signal in accordance with the comparison;

pulse generator means for generating clock pulses of constant frequency having a period equal to one of the period of the line frequency of the A.C. line source and of an integral multiple of the period of the line frequency of the A.C. line source, the clock pulses being advanced in phase by a predetermined amount from zero-crossing of the line voltage of said A.C. line source;

digital means for receiving the clock pulses from said pulse generator means and for generating a plurality of second logical output signals by adding or subtracting pulses having the same period as the clock pulses of constant frequency and the same polarity as the first logical output signal;

arc voltage zero-potential detecting means for generating an output pulse upon detecting the approximate zero-potential of the arc voltage;

current supplying means comprising a plurality of reactors or transformers whose reactance of winding is in a geometrical progression of ratio 2;

switching means comprising a plurality of switches for making and breaking electrical connections between more than one reactor or transformer and one of the A.C. line source and a welding current output lead connected with output terminals of the welder, and gate circuit means for connecting said digital means with said switching means, said gate circuit means passing a plurality of said second logical output signals to a plurality of switches of said switching means, respectively, only when the output pulse of said arc voltage zero-phase detecting means is applied thereto, said switching means increasing or decreasing the output current at each clock pulse by a predetermined constant low current value with respect to the output current value immediately prior to the clock pulse.

8. An alternating current arc welder according to claim 7, wherein said pulse generator means generates clock pulses at the same rate as the frequency of the line voltage and advanced in phase by a predetermined amount from the zero-crossings thereof, said pulse generator means comprising rectifier means to rectify the line voltage, trigger circuit means to generate trigger pulses from the rectified line voltage, and monostable multivibrator means to generate clock pulses from the trigger pulses.

* * * * *